(12) United States Patent
Bourret et al.

(10) Patent No.: US 9,058,743 B2
(45) Date of Patent: Jun. 16, 2015

(54) AUTOMATIC LANDING METHOD AND DEVICE FOR AN AIRCRAFT ON A STRONG SLOPE RUNWAY

(71) Applicant: AIRBUS OPERATIONS (SAS), Toulouse (FR)

(72) Inventors: Thierry Bourret, Toulouse (FR); Jean Muller, Tournefeuille (FR); Mathieu Galy, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 233 days.

(21) Appl. No.: 13/659,093

(22) Filed: Oct. 24, 2012

(65) Prior Publication Data
US 2013/0103233 A1 Apr. 25, 2013

(30) Foreign Application Priority Data

Oct. 24, 2011 (FR) ...................................... 11 59602

(51) Int. Cl.
| | | |
|---|---|---|
| *G08G 5/02* | (2006.01) |
| *G05D 1/08* | (2006.01) |
| *G01C 23/00* | (2006.01) |
| *B64D 45/04* | (2006.01) |
| *G05D 1/06* | (2006.01) |

(52) U.S. Cl.
CPC ........ *G08G 5/02* (2013.01); *G01C 23/00* (2013.01); *G08G 5/025* (2013.01); *G05D 1/08* (2013.01); *G01C 23/005* (2013.01); *B64D 45/04* (2013.01); *G05D 1/0676* (2013.01)

(58) Field of Classification Search
None
See application file for complete search history.

(56) References Cited

U.S. PATENT DOCUMENTS

| | | | | |
|---|---|---|---|---|
| 4,357,661 A | * | 11/1982 | Lambregts et al. | 701/18 |
| 4,638,437 A | | 1/1987 | Cleary et al. | |
| 4,925,303 A | | 5/1990 | Pusic | |
| 5,111,403 A | * | 5/1992 | Orgun et al. | 701/16 |
| 8,374,736 B1 | * | 2/2013 | Rupnik | 701/17 |
| 2006/0195235 A1 | * | 8/2006 | Ishihara et al. | 701/16 |
| 2007/0124034 A1 | * | 5/2007 | Pitard et al. | 701/15 |

FOREIGN PATENT DOCUMENTS

WO   WO 2010/144014   12/2010

OTHER PUBLICATIONS

Search Report for FR 1159602 dated Jun. 25, 2012.

* cited by examiner

Primary Examiner — John R Olszewski
Assistant Examiner — Gerrad A Foster
(74) Attorney, Agent, or Firm — Nixon & Vanderhye P.C.

(57) ABSTRACT

An automatic landing method and device for an aircraft on a runway with strong slope. The device includes means to automatically transmit, a runway slope value to an automatic piloting system of the aircraft, and said automatic piloting system uses the slope value to automatically manage the flare phase upon landing.

19 Claims, 2 Drawing Sheets

AUTOMATIC LANDING METHOD AND DEVICE FOR AN AIRCRAFT ON A STRONG SLOPE RUNWAY

BACKGROUND AND SUMMARY OF INVENTION

The present invention relates to an automatic landing method and device for an aircraft, in particular a transport airplane, on a landing runway having a strong slope being higher than a predetermined value.

In the scope of the present invention, the expression strong slope (of a landing runway) means a slope which is higher (in absolute value) than a predetermined value, preferably 0.8%, and more precisely higher than the usual certification values for a current automatic piloting system.

On the present airplanes, an onboard automatic landing system can be developed so as to allow a landing in a bad visibility condition. To perform such a landing with no visibility (or with a very weak visibility), it is necessary to have available ground facilities (of the usual "ILS CAT II" or "ILS CAT III" type) which are quite expensive.

Furthermore, new guiding means of the GPS type with a regional increase (for example either of the WAAS type in Northern America or of the AGNOS type in Europe) are expanding. Such means which do not need any ground facilities on each airport present precision levels which make their use conceivable to perform an automatic landing. Even if such means do not allow the visibility minima to be reduced, an automatic landing can be preferable to a manual landing when the external conditions become unfavorable (crosswind, turbulence, downwind, front sun, night condition for example).

On the airplanes provided with a usual automatic landing function, the automatic piloting system possesses a flare-out control law allowing the vertical speed of the airplane to be reduced so as to obtain:

an impact vertical speed that is weak (typically −2 feet per second); and an impact point that is close to the theoretical touch point (typically 400 m downstream from the runway threshold).

Indeed, a high impact vertical speed can lead to a passenger discomfort and, if it goes beyond extreme values, to structural limit values being exceeded, for which the airplane has been designed.

Moreover, if the actual impact point is too far from the theoretical impact point, the remaining runway distance for braking on the airplane decreases and, in extreme cases, can lead to a turn-off of the airplane from the landing taxiway.

Such two main parameters (impact vertical speed and impact point) must thus be controlled, and the aeronautical regulations impose to an automatic piloting system provided with an automatic landing function a statistical performance demonstration of the system, so as to show that the probability to exceed extreme values remains included in an acceptable proportion, whatever the external conditions.

Usually, the flare represents the part of the approach trajectory immediately preceding the contact with the ground, during which a straightening procedure of the airplane is performed.

The present automatic piloting systems are certified on slightly inclined airfields (for example +/−0.8%, what allows in practice the whole airfields equipped with CAT II and CAT III type facilities to be covered, for which an automatic landing system is required.

On the contrary, in a manual piloting, an airplane is certified to land on airfields presenting higher slopes (for example +/−2%).

On airfields with high slope, the automatic landing function (of an automatic piloting system) cannot be presently used.

Indeed, usually, an automatic piloting system uses for the flare phase, in order to be positioned in altitude with respect to the runway, a radio altimeter that measures the height with respect to the airfield, directly under the airplane.

In the usual systems, the radio altimeter is used:

on the one side, for starting the flare when a given height with respect to the airfield (which can be adapted depending on the airplane speed and can be located before or after the runway threshold) is reached by the airplane; and on the other side, to estimate the runway slope and adapt the airplane trajectory therefor.

The flare phase is generally very short (typically 7 s). Consequently, the automatic piloting system has not much time available to perform the corrections. The setting of the flare law goes thru an a priori knowledge of the procedure to follow (for instance by using mass and ground speed) to adapt the starting height and a pre-control (initial value of the nose up command to apply to the aircraft) so as to correctly initiate the trajectory change being required during such phase.

On airfields with high slope, the problems to be solved are as follows:

on a climbing runway, the flare starting must be anticipated, frequently before the runway threshold and the pre-control must be strong, otherwise the ground impact speed will be very high; and on a descending runway, the flare starting must be delayed, frequently well after the runway threshold and the pre-control must be very weak, otherwise the impact area of the airplane wheels is very distant from the runway threshold in the case where the slope is unfavorable for the airplane braking.

On the airfields with strong slope, it is thus necessary to know the runway slope before even the flare starting, but also before the runway threshold, including on climbing runways. Now, the available radio altimeter information, which allows the runway slope to be determined, can only be measured by the radio altimeter under the airplane (and not ahead of the airplane).

Furthermore, it is hardly conceivable to use the slope information before the runway threshold to extrapolate the runway slope, since there is no guarantee of continuity.

Consequently, a usual automatic piloting system is not in a position to perform an automatic landing on a runway with strong slope with the means being available, namely a radio altimeter only.

The present invention aims at remedying such drawbacks. It relates to a method to perform an automatic landing of an aircraft on a landing runway presenting a strong slope, which is higher than a predetermined value and preferably higher than the usual certification values for a current automatic piloting system.

With this end in view, according to the invention, said method is remarkable in that, upon the landing comprising a flare phase, when the aircraft is in approach of the runway, the following operations are performed on said aircraft:

anticipatively, a runway slope value is automatically transmitted to an automatic piloting system of the aircraft, and said automatic piloting system uses such slope value to automatically manage the flare phase of the aircraft.

Thus, thanks to the invention, thru the anticipated reception of the slope value of the landing runway, the automatic piloting system is in a position to anticipate enough of the particular characteristics, detailed hereunder, of the flare trajectory (which is significantly different either on a strongly climbing or strongly descending runway), and thus to automatically manage the flare phase and thus the landing of the aircraft.

Advantageously, said automatic piloting system can use the runway slope value anticipatively received:
  to determine a flare starting height; and/or
  to determine a nose up value of the aircraft upon flare; and/or
  to determine a reference profile being adapted to an anticipated trajectory of the aircraft; and/or
  to activate, upon the flare phase, extra aerodynamic surfaces being specific for the aircraft, essentially airbrakes.

Furthermore, in a preferred embodiment, the runway slope value is determined, at least for a part of the runway (generally between the upstream threshold of the runway and the maximum spacing area of the wheel impact, for example 900 m downstream from said upstream threshold) at the level of which the flare must be performed, such slope value being then automatically transmitted to said automatic piloting system of the aircraft.

To do so, advantageously:
  said runway slope value is manually input by an operator of the aircraft; and/or
  said runway slope value is coming from an onboard data base; and/or
  said runway slope value is automatically calculated from a runway profile coming from an onboard data base; and/or
  said runway slope value is automatically measured thru at least one sensor arranged on the aircraft and making distance measurements ahead of the aircraft.

It is also conceivable to combine several of the preceding methods to determine the runway slope value.

Moreover, in a preferred embodiment, a monitoring method is implemented so as to be able to detect an erroneous value for said slope value. Preferably, at least one of the following monitoring methods is implemented:
  an auxiliary slope value is estimated based on the comparison between data supplied by a radio altimeter of the aircraft and a vertical inertial speed of the aircraft and such auxiliary slope value is compared with said slope value;
  a correlation is made between a flied over airfield profile determined by a radio altimeter of the aircraft and an airfield profile stored in an onboard date base;
  an auxiliary slope value is automatically measured on the aircraft thru an onboard sensor and such auxiliary slope value is compared which said slope value.

Including for increased efficiency and reliability reasons, it is also conceivable to combine several of the preceding monitoring methods.

Advantageously, should an erroneous slope value be detected, at least one of the following operations is performed:
  an alert is emitted;
  it is asked to the aircraft crew, preferably via an alert, to implement a go-around;
  the automatic piloting system is controlled so as to perform an automatic go-around;
  the crew is provided with information on the origin of the failure and on actions to be taken, preferably thru a display.

The present invention also relates to an automatic landing device of an aircraft on a landing runway with a strong slope.

According to the invention, said device is remarkable in that is comprises:
  means to automatically transmit on an anticipated way the runway slope value to an automatic piloting system of the aircraft; and
  said automatic piloting system uses said slope value to automatically manage the flare phase of the aircraft.

In a particular embodiment, said device further comprises at least one of the following means:
  at least one means to determine the runway slope value; and
  at least one means to monitor said runway slope value.

The present invention also relates to an aircraft, in particular a transport airplane, being provided with an automatic landing device such as the one above mentioned.

SUMMARY OF DRAWINGS

The FIGS. of the accompanying drawing will make well understood how the invention can be implemented. On FIGS. identical reference annotations denote similar elements.

DETAILED DESCRIPTION OF INVENTION

Figure 1:
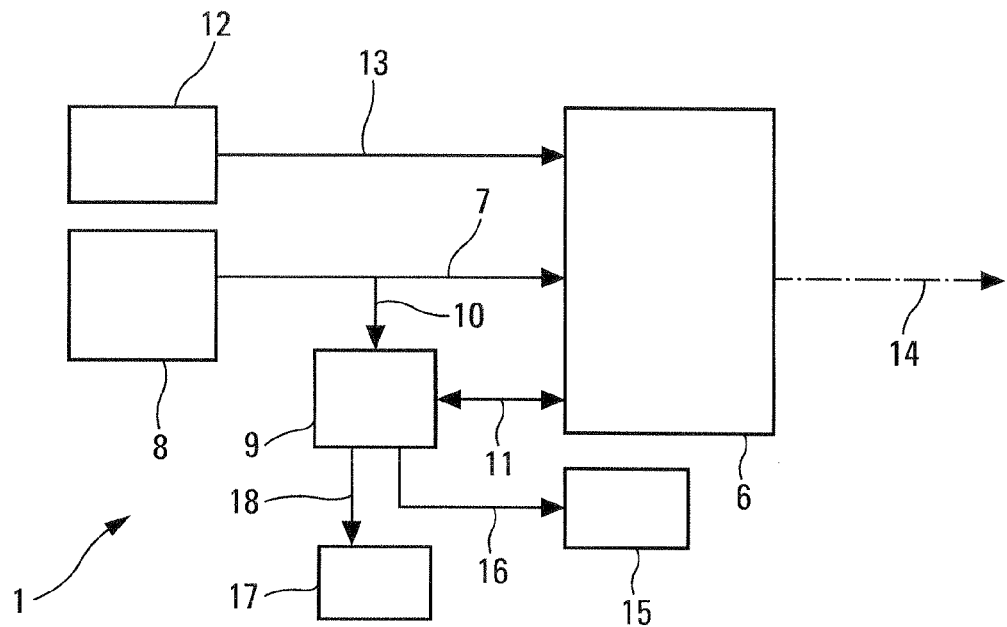
FIG. 1 is the block diagram of a device according to the invention.

The device 1 according to the invention and schematically represented on FIG. 1 is intended for implementing an automatic landing of an aircraft AC, in particular a transport airplane, on a landing runway of an airport having a strong slope.

In the scope of the present invention, it is meant:
  by a strong slope (of a landing runway), a slope being higher (in absolute value) than a predetermined value, preferably 0.8% and more precisely being higher than the usual certification values of a current automatic piloting system; and
  by a pre-control, the initial value of the nose up command applied to the aircraft AC to generate the flare, allowing the trajectory change required during the flare phase to be correctly initiated.

Figure 2:
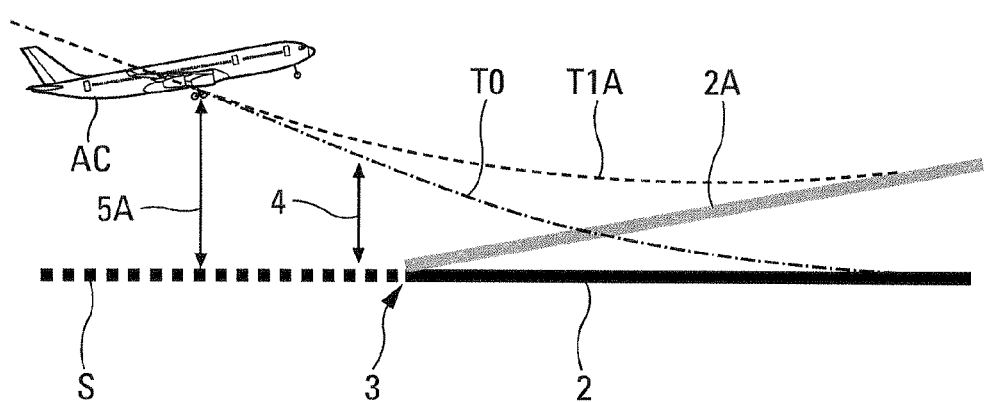
FIGS. 2 and 3 show schematically a landing, respectively, for a climbing runway and a descending runway.
Figure 3:
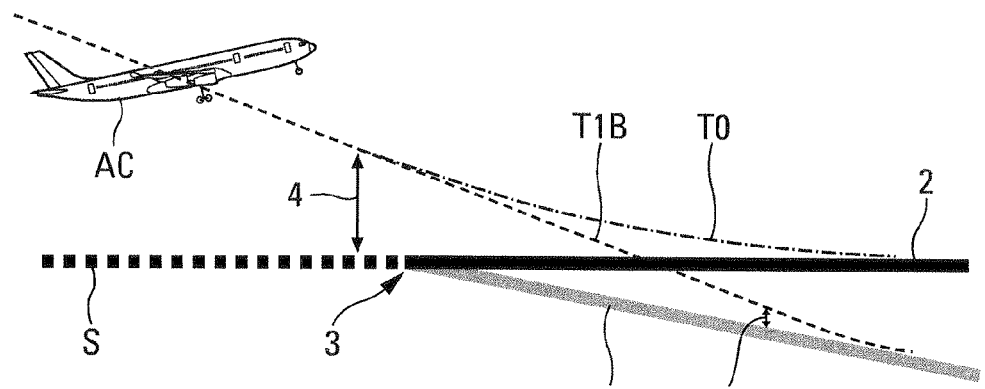

On FIGS. 2 and 3, exemplary landings on airfields with strong slope have been represented, respectively, for a climbing runway and a descending runway. On this FIGS. 2 and 3, there are represented:
  on the one side, in mixed lines a current landing trajectory T0 on a horizontal runway 2 (of the upstream threshold 3), by highlighting with an arrow 4 the flare starting position and the corresponding height with respect to the ground S; and
  on the other side, in broken lines, a current landing trajectory T1A, T1B on an inclined runway 2A, 2B, by highlighting by an arrow 5A, 5B the corresponding flare starting position.

In such a case:
  for a climbing runway 2A, as shown on FIG. 2, the flare starting must be anticipated, frequently before the threshold 3 of the runway 2A and the pre-control (initial value of the nose up command applied to the aircraft AC) must be strong, otherwise the ground impact speed will be very high; and for a descending runway 2B, as shown on FIG. 3, the flare starting must be delayed, frequently well after the threshold 3 of the runway 2B, and the pre-control must be very weak, otherwise the impact area of the wheels of the aircraft AC will be very distant of the threshold 3 of the runway 2B in the case where the slope is unfavorable upon breaking of the aircraft AC.

On the airfields with a strong slope, it is thus necessary to know the slope of the runway 2A, 2B before even the flare starting, but also before the threshold 3 of the runway, including on climbing runways 2A.

According to the invention, said onboard device 1 comprises an automatic piloting system 6 provided with an automatic landing function. Moreover, according to the invention, said device 1 also comprises:

means, in particular a link 7, to automatically transmit on an anticipated way a slope value of the runway 2A, 23 (used for landing) to said automatic piloting system 6; and said automatic piloting system 6 uses such slope value to automatically manage the flare phase of the aircraft AC. Such management is implemented by an automatic generation of command controls which are automatically applied to setting means (not shown) of the aircraft AC, such as control surfaces, engines and/or brakes, as illustrated by an arrow 14 in mixed lines.

In a particular embodiment, said device 1 moreover comprises the following elements detailed hereinafter:

a set 8 of means to determine the slope value of the runway 2A, 2B, being transmitted by the link 7 to said automatic piloting system 6; and a set 9 of monitoring means, which is for example connected by links 10 and 11 to the link 7 and to the automatic piloting system 6 and which intended to monitor the slope value of the runway being used by the latter, as précised hereinafter.

Said device 1 also comprises at least some of the following elements which, for simplification reasons, are grouped together on FIG. 1 into one unit 12 being connected thru a link 13 to the automatic piloting system 6 and which are intended to provide it with information:

a set of current information sources as detailed hereinafter, allowing the current values of the flight parameters of the aircraft AC to be determined;

one or more data bases; and interface means, in particular a keyboard associated with a screen or any other usual means allowing a pilot to enter data in the device 1.

Said set of information sources can, example, comprise:

an air data calculator ADC;

an inertial reference system IRS; and a flight management system FMS.

Said device 1 also comprises displaying means 15 which are for example connected thru a link 16 to the set 9 and which are formed so as to present to a pilot of the aircraft information relative to the implementation of the invention, as detailed hereinafter.

Thus, thru the anticipated reception of the slope value of the landing runway 2A, 2B, the automatic piloting system 6 is able to anticipate enough of the particular characteristics, detailed hereinafter, on the flare trajectory (which is significantly different either on a strongly climbing or a strongly descending runway) and thus to automatically manage the flare phase and thus the landing of the aircraft AC.

In the scope of the present invention, said automatic piloting system 6 can use the runway slope value, being received on an anticipated way, in different ways, and in particular, as detailed hereinafter:

to determine a flare starting height;

to determine a nose up (pre-control) value of the aircraft AC upon flare;

to determine a reference profile being adapted to an anticipated trajectory of the aircraft AC; and to activate, upon the flare phase, extra aerodynamic surfaces specific for the aircraft AC, essentially airbrakes.

Thus, in a first embodiment, the automatic piloting system 6 uses the slope value (of the runway) being received to determine the flare starting height. To do so, said automatic piloting system 6 uses at least one predetermined table supplying a flare starting height depending on said slope value and other parameters (the mass and the ground speed of the aircraft AC) being available on said aircraft AC, for instance via the unit 12. Such table which is for example stored in the system 6 or in the unit 12 is representative of the aircraft AC and is determined at least partially on an empiric way, thru simulations and/or flight trials.

In a second embodiment, the automatic piloting system 6 uses the received slope value to determine the flare precommand (namely the initial value of the pull up order). To do so, the automatic piloting system 6 also uses at least one predetermined table indicating the precommand value depending on said slope value and other parameters (the mass and the ground speed of the aircraft AC) being available on said aircraft AC, for example thru the unit 12. Such table, which is for instance stored in the system 6 or in the unit 12 is representative of the aircraft AC and is also determined, at least partially, on an empiric way thru simulations and/or flight trials.

In a third embodiment, said automatic piloting system 6 uses the received slope value to determine a reference profile being adapted to the anticipated trajectory of the aircraft AC. Such trajectory allows to have a reference available, around which the aircraft AC could be mastered, so as to compensate for any possible perturbation and thereby reduce the dispersion of the impact point and of the impact vertical speed.

A profile is determined which, depending on the initial conditions and the known final condition, defines a reference trajectory being appropriate to target for example a vertical speed of −2.5 ft/min at the distance from the impact being desired.

The reference profile can define a vertical speed with respect to the runway. Such vertical speed with respect to the runway is the sum of several contributions: the component due to the inertial speed of the aircraft and the component related to the runway slope.

From such vertical speed profile with respect to the runway, it is possible to currently determine a height profile with respect to the ground by a mere integration.

In a fourth embodiment, the automatic piloting system 6 uses the received slope value to control, during the flare phase, extra aerodynamic surfaces being specific for the aircraft AC, usually non used upon the flare phase, such as airbrakes. Such aerodynamic surfaces allow to make the mastering easier in particular when it is desired to land on very descending slopes for which the natural tendency of the aircraft AC has a good chance to risk to lead to an impact area being very far from the targeted place.

It is also conceivable to combine several of the embodiments above described concerning the use of the slope value by the automatic piloting system 6.

Furthermore, in a preferred embodiment, the device 1 comprises said set 8 determining the runway slope value, at least for this part of the runway 2A, 2B at the level of which the flare is to be performed, such slope value being then automatically transmitted to said automatic piloting system 6 via the link 7. The information related to the runway which is necessary for the automatic piloting system 6, in particular to implement the above mentioned functions, is the runway slope in the portion of the runway where the flare occurs (typically between the threshold 3 of the runway 2A, 2B and the maximum impact area for the wheels, generally at 900 m downstream from the threshold 3).

Said set 8 can comprise different means to determine said slope value.

In a first embodiment, said set 8 can comprise an interface, particularly an interface already existing, for example, on the FMS system, allowing the pilot to manually input the median slope of the runway (in the portion of the runway where the flare occurs). Such data is available on some approach maps or, by default, can be previously prepared for the airfields on which the aircraft AC is able to be operated. In this embodiment, the changes to be made for the FMS system are quite minor, and the operational procedure to use the system remains simple, the information being indicated at the moment where the approach is prepared.

In another embodiment of the invention, the device 1 contains, via the FMS system (or any other equivalent system), a data base which associates with each runway slope information in the runway portion where the flare occurs. In this embodiment, when the pilot selects in the FMS system the runway on which he desires to land the FMS system automatically supplies to the automatic piloting system 6 the runway slope information being necessary and no extra intervention of the crew is required, thereby reducing the work load of the crew with respect to the first above mentioned embodiment.

In an alternative of such last embodiment, the data base can contain the profile of the whole runway 2A, 2B (and not the median slope of the runway in the portion of runway where the flare occurs). In this case, the information necessary for the automatic piloting system 6 (namely the median slope in the part of the implementation of the flare is simply extracted from the information contained within this data base.

In another embodiment of the invention, said set 8 comprises at least a specific sensor which is onboard the aircraft AC and which is intended for measuring the runway slope value. Such sensor (which is for example part of the unit 12) can be of the "radar" type operating in the radio-electric field, or of the "Lidar" based on laser measurements, or it can correspond to a laser telemeter. This sensor performs distance measurements ahead of the aircraft AC, as represented on FIG. 4 by rectilinear beams 20. In this embodiment, no intervention of the crew is necessary, and the set 8 can operate even on a runway 2A, 2B which is not present in the above mentioned data base of the FMS system, or in case of a failure of the latter.

In another embodiment of the invention, the set 8 comprises several of the above mentioned embodiments, thereby allowing a slope value to be supplied to the automatic piloting system 6, whatever the failure cases (including of the FMS system), including for non referenced runways in the data bases of the FMS system, or for runways for which the information being looked for is not available on the approach maps.

In all the embodiments of the invention allowing a runway slope value to be determined and supplied to the automatic piloting system 6, there is a risk that the information being supplied is erroneous. By "erroneous", it is meant available information at the level of the automatic piloting system 6 which is very different from the actual value, and this whatever the reasons having caused such situation. In particular:

the crew can make a mistake while inputting the slope value (for example, they can input 2% instead of 0.2%) or can make a mistake on the sign (1% instead of −1%);

a data base generally containing information related to thousands of runways, it is possible that the data associated with a runway can be attributed to another runway either upon the generation of the data base, or by an erroneous operation of the FMS system;

the crew can select the good runway on the FMS system, but can make a mistake about the landing direction upon the selection; and the crew can select the right runway in the right direction on the FMS system, but decide at the last moment to change the landing direction, for example, to avoid an abrupt change of the wind direction.

To remedy such drawbacks, the set 9 comprises means (not shown) intended for performing a monitoring so as to be able to detect an erroneous value for said slope value.

In a first embodiment, the set 9 comprises means to detect, during at least one predetermined time, a deviation between the runway slope value provided for the automatic piloting system 6 and the slope value directly measured or determined thru measurements.

In this case, the set 9 comprises means 21 to perform an estimation of the runway actual slope, which is based on the comparison between the value supplied by a radio altimeter of the aircraft AC and an inertial vertical speed of the aircraft AC which is currently obtained from means of the unit 12. These means 21 allow the vertical speed with respect to the runway to be calculated.

Figure 5:
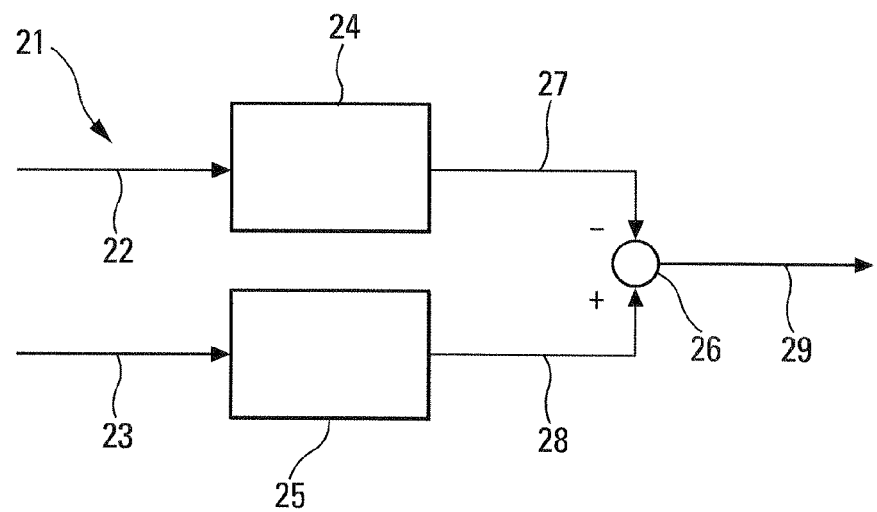
FIG. 5 is the bloc diagram of particular calculation means for a device according to the invention.

As shown on FIG. 5, these means 21:

receive a height value supplied by the radio altimeter via a link 22 and an inertial vertical speed supplied by the inertial unit via a link 23;

submit the height value to high-pass filter 234 and the inertial vertical speed to low-pass filter 25; and calculate thru one element 26 the difference between the results of the filters 24 and 25 respectively received thru links 27 and 28 an supply the result, namely the vertical speed due to the runway slope, thru a link 29.

From this data, means of the set 9 currently calculate the equivalent slope value by using the ground speed of the aircraft AC. This equivalent slope value is then compared to said slope value to be monitored.

In another embodiment, means of the set 9 perform a correlation between the profile of the airfield being flied over, determined by the radio altimeter, and an airfield profile stored within a data base in particular from the FMS. This embodiment is more robust than the preceding embodiment with respect to the runway profiles having significant slope changes in the flare area.

Figure 4:
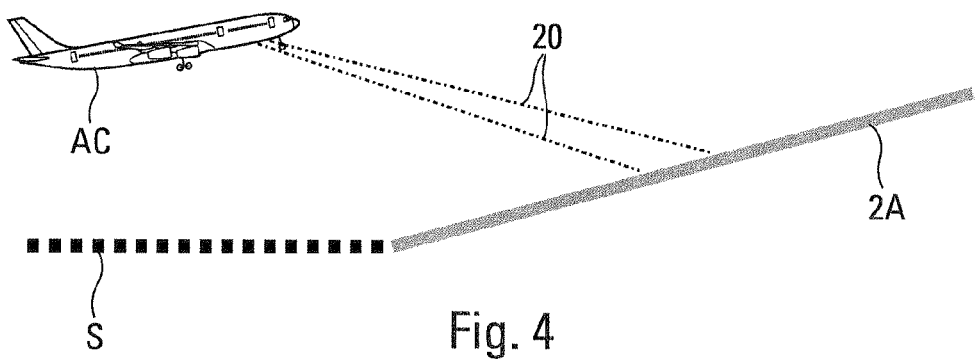
FIG. 4 shows schematically a distance measurement of the runway ahead of the aircraft.

In another embodiment, the set 9 comprises means to make a comparison between the runway slope available at the level of the automatic piloting system 6 and a runway slope from a sensor allowing a direct measurement of the latter, as above indicated I reference to FIG. 4. Such solution allows an inconsistency soon enough before the flying over of the threshold 3 of the runway (typically at about 100 ft).

Furthermore, in a last embodiment of the invention, several of the above mentioned embodiments can be combined within the set 9.

Moreover, should an erroneous slope value be detected by the set 9, said device 1 performs at least one of the following operations:

- it emits "sound" and/or "visual" type alert in the cockpit thru alert means 17 (which are for example connected by a link 18 to the set 9) so as to warn the pilot;
- it asks the crew of the aircraft AC, by starting an appropriate alert (thru said alert means for example), to perform a go-around. Such alert should allow a go-around to be made taking a reaction time from the crew into account, while ensuring the integrity of the aircraft AC (avoiding any impact risk with the runway at a high vertical speed, including during the go-around procedure);
- it supplies to the crew, preferably via the displaying means 15, information on the origin of the failure and on actions to be taken to successfully land upon a new approach on the same airfield. For example, it can ask the crew to verify the slope value supplied to the automatic piloting system 6 and/or to modify such value thru an interface.

In an alternative embodiment, should an erroneous slope value be detected by the set 9, said automatic piloting system 6 is automatically controlled to make an automatic go-around, thereby allowing in particular not to take the reaction time from the crew into account.

The device 1 according to the present invention thus presents numerous advantages. In particular, it allows:

- the automatic piloting system 6 to be adapted so that it is able to perform automatic landings on runways 2a, 2b with strong slope;
- a slope value of the runway 2a, 2b to be supplied to the automatic piloting system 6 thru the set 8; and
- a possible inconsistency to be detected between the slope value supplied to the automatic piloting system 6 and, in particular, a measurement made by a radio altimeter upon the flying over of the runway or by a sensor measuring the runway slope before the flare starting.

The invention claimed is:

1. An automatic landing method of an aircraft (AC) on a landing runway, wherein the aircraft includes an automatic piloting system, the method comprising:
   - obtaining a slope value of the landing runway and providing the slope value to an automatic piloting system of the aircraft (AC) before the aircraft is over a threshold for the landing runway;
   - automatically determining by the automatic piloting system whether the slope value of the landing runway exceeds a certain slope value, wherein the determination indicates whether the landing runway has an upward slope that exceeds a certification value for the automatic piloting system or a downward slope exceeding the certification value for the automatic piloting system and the determination is made before the aircraft is over the threshold for the landing runway, and
   - if the automatic piloting system determines the slope value of the landing runway exceeds the certification value, said automatic piloting system uses the slope value of the landing runway to automatically manage a flare phase of the aircraft (AC), wherein a management of the flare phase is initiated before the aircraft is over the threshold for the landing runway.

2. The method according to claim 1, wherein the management of the flare includes said automatic piloting systems using the slope value to determine a flare start height and applying the flare start height to start the flare phase.

3. The method according to claim 1, wherein said automatic piloting system uses the slope value to determine a nose up value of the aircraft (AC) for the flare phase.

4. The method according to claim 1, wherein said automatic piloting system uses the slope value to determine a reference profile for an anticipated trajectory of the aircraft (AC).

5. The method according to claim 1, wherein said automatic piloting system uses the slope value to activate, during the flare phase, aerodynamic control surfaces of the aircraft.

6. The method according to claim 1, wherein the slope value represents a slope of a part of the landing runway over which the flare phase is to occur.

7. The method according to claim 6, wherein the obtaining of said slope value includes manually inputting the slope value by an operator of the aircraft (AC).

8. The method according to claim 6, wherein the obtaining of said slope value includes automatically retrieving the slope value from an onboard data base on the aircraft (AC).

9. The method according to claim 6, wherein the obtaining of said slope value of the runway includes automatically calculating the slope value from a runway profile retrieved from a data base stored on the aircraft (AC).

10. The method according to claim 6, wherein the obtaining of said slope value of the runway includes using at least one sensor arranged on the aircraft (AC) to obtain data from which the slope value is calculated.

11. The method according to claim 1, further comprising monitoring the slope value to detect an erroneous value for said slope value.

12. The method according to claim 11, wherein the monitoring includes at least one of:
    - estimating an auxiliary slope value based on a comparison between data supplied by a radio altimeter on the aircraft (AC) and an inertial vertical speed of the aircraft (AC), and comparing the auxiliary slope value to said slope value;
    - correlating a flied over an airfield profile determined by a radio altimeter of the aircraft (AC) with an airfield profile stored in an onboard data base; and
    - measuring an auxiliary slope value using an onboard sensor on the aircraft (AC) and comparing said auxiliary slope value to said slope value.

13. The method according to claim 11, wherein the monitoring includes responding to the detection of the erroneous value for said slope value, performing at least one of the following operations:
    - emitting an alert to an operator of the aircraft (AC);
    - displaying to the operator a suggestion for the aircraft (AC) to implement a go-around;
    - automatically initiating a go-around operation by the automatic piloting system; and
    - displaying to the operator information indicating an origin of the erroneous slope value.

14. An automatic landing device of an aircraft (AC) on a landing runway, the device comprising:
    - means to automatically transmit the slope value of the runway to an automatic piloting system of the aircraft (AC); and
    - means to automatically determine whether the absolute value of the transmitted slope value exceeds a certification value of the automatic landing device; and
    - said automatic landing device using said transmitted slope value to automatically manage the flare phase of the aircraft (AC), wherein the automatic management of the flare phase is initiated before the aircraft is over the threshold of the landing runway.

15. The device according to claim 14, further comprising at least one of:
- at least one means to determine said slope value of the runway; and
- at least one means to monitor said slope value of the runway.

16. A method for landing an aircraft having a flight control system including at least one of an automatic piloting system or a flight management system, the method comprising:
- determining with the flight control system a parameter for flaring the aircraft on a landing runway wherein the determination is made before the aircraft is over a threshold of the landing runway;
- obtaining a slope for the landing runway before the aircraft is over the threshold of the landing runway;
- determining by the flight control system at least one of whether the slope of the landing runway exceeds a certain upward slope value and whether the slope of the landing runway exceeds a certain downward slope value, wherein the certain downward and upward slope values each correspond to a slope of at least eight tenths of a percent (0.8%), and the determination occurs before the aircraft is over the threshold of the landing runway;
- in response to the determination that the slope of the landing runway exceeds the certain upward or the downward slope value, the flight control system uses the slope of the landing runway to modify the parameter before the aircraft is over the threshold of the landing runway, and
- using the modified parameter to flare the aircraft to land on the landing runway.

17. The method for landing the aircraft of claim 16 wherein the step of using the modified parameter includes automatically landing the aircraft using the automatic piloting system.

18. The method for landing the aircraft of claim 16 wherein the step of using the modified parameter includes indicating to a pilot of the aircraft an altitude of the aircraft to initiate a flare, wherein the modified parameter is used to determine the altitude of the aircraft to initiate the flare.

19. A method for landing an aircraft having a flight control system including at least on of an automatic piloting system or a flight management system, the method comprising:
- obtaining a slope for the landing runway before the aircraft is over a threshold of the landing runway;
- determining at least one of whether the slope of the landing runway exceeds a certain upward slope value and whether the slope of the landing runway exceeds a certain downward slope value, wherein the certain downward and upward slope values each correspond to a slope of at least eight tenths of a percent (0.8%), and the determination occurs before the aircraft is over the threshold of the landing runway;
- in response to the determination that the slope of the landing runway exceeds the certain upward or downward slope value, the flight management system, before the aircraft is over the threshold, uses the slope of the landing runway to determine a parameter for flaring the aircraft, and
- using the parameter to flare the aircraft to land on the landing runway.

* * * * *